Figure 1:
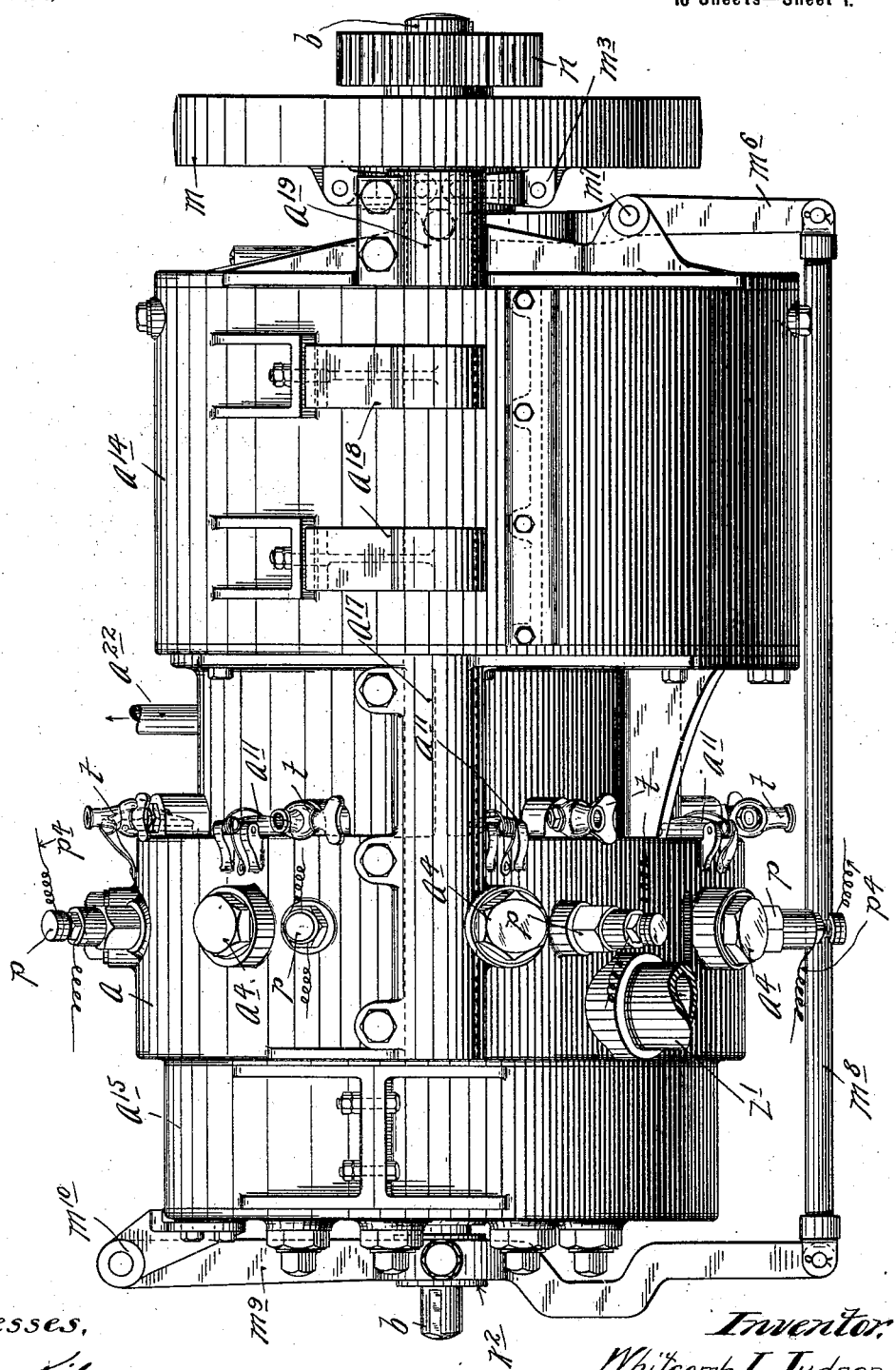

No. 712,805. Patented Nov. 4, 1902.
W. L. JUDSON.
EXPLOSIVE ENGINE.
(Application filed Apr. 25, 1901. Renewed July 3, 1902.)
(No Model.) 10 Sheets—Sheet 1.

Witnesses,
Harry Kilgore
Elizabeth Kelley

Inventor,
Whitcomb L. Judson.
By his Attorneys,
Williamson & Merchant

No. 712,805. Patented Nov. 4, 1902.
W. L. JUDSON.
EXPLOSIVE ENGINE.
(Application filed Apr. 25, 1901. Renewed July 3, 1902.)
(No Model.) 10 Sheets—Sheet 3.

Witnesses.
Harry Kilgore
Elizabeth Ketcher

Inventor:
Whitcomb L. Judson,
By his Attorneys,
Williamson & Merchant

No. 712,805. Patented Nov. 4, 1902.
W. L. JUDSON.
EXPLOSIVE ENGINE.
(Application filed Apr. 25, 1901. Renewed July 3, 1902.)

(No Model.) 10 Sheets—Sheet 4.

Witnesses.
Harry Kilgore
Elizabeth Keenin

Inventor.
Whitcomb L. Judson
By his Attorneys.
Williamson & Merchant

No. 712,805. Patented Nov. 4, 1902.
W. L. JUDSON.
EXPLOSIVE ENGINE.
(Application filed Apr. 25, 1901. Renewed July 3, 1902.)

(No Model.) 10 Sheets—Sheet 5.

Witnesses.
Harry Kilgore
Elizabeth Keliher

Inventor.
Whitcomb L. Judson,
By his Attorneys,
Williamson & Merchant

No. 712,805. Patented Nov. 4, 1902.
W. L. JUDSON.
EXPLOSIVE ENGINE.
(Application filed Apr. 25, 1901. Renewed July 3, 1902.)
(No Model.) 10 Sheets—Sheet 6.

Witnesses.
Harry Kilgore
Elizabeth Keeler

Inventor.
Whitcomb L. Judson.
By his Attorneys,
Williamson & Merchant

No. 712,805. Patented Nov. 4, 1902.
W. L. JUDSON.
EXPLOSIVE ENGINE.
(Application filed Apr. 25, 1901. Renewed July 3, 1902.)
(No Model.) 10 Sheets—Sheet 7.
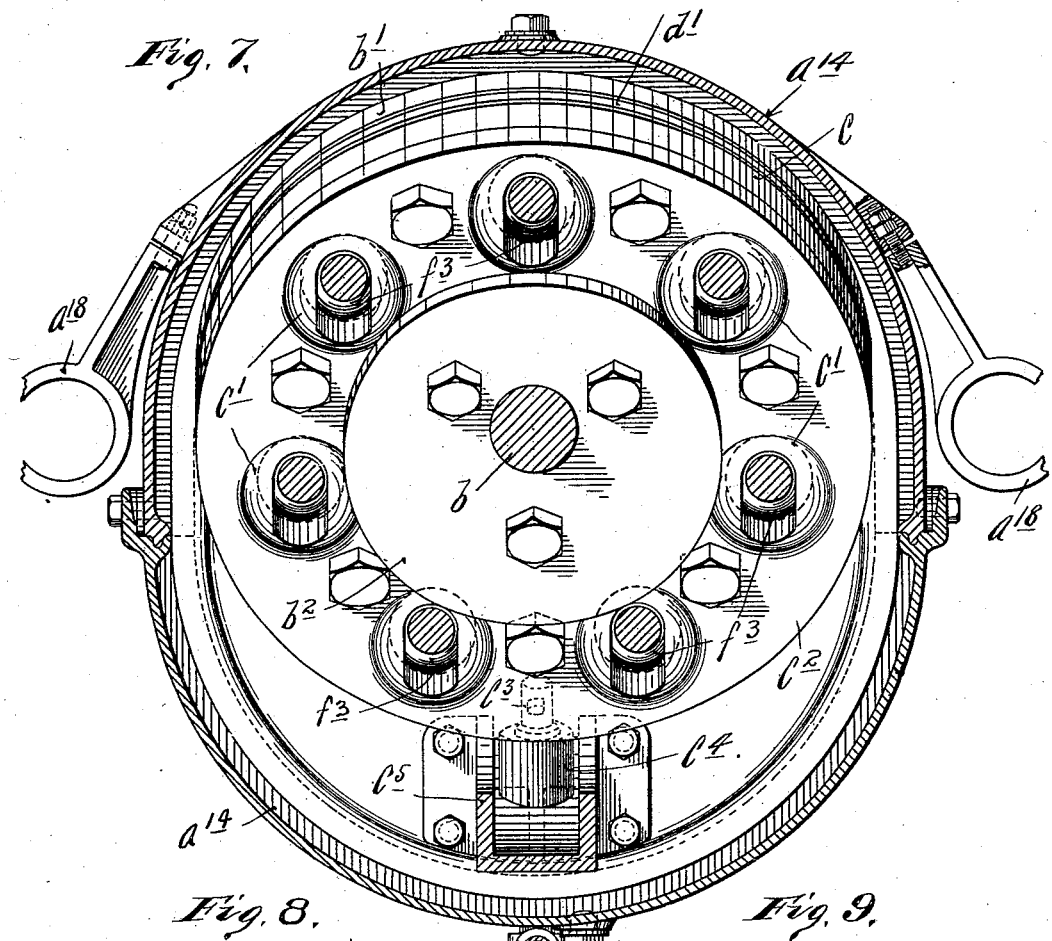
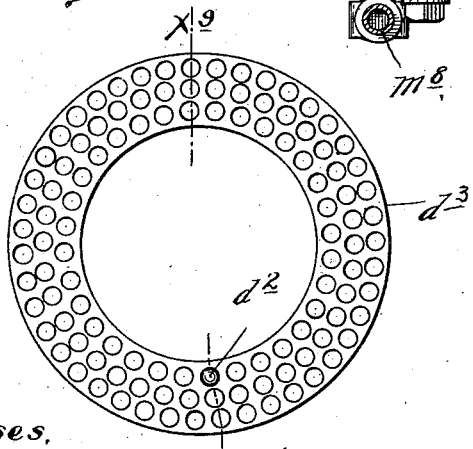
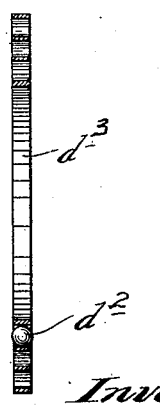
Witnesses. Inventor.
Harry Kilgore Whitcomb L. Judson,
Elizabeth Keeline By his Attorneys,
Williamson & Merchant No. 712,805. Patented Nov. 4, 1902.
W. L. JUDSON.
EXPLOSIVE ENGINE.
(Application filed Apr. 25, 1901. Renewed July 3, 1902.)
(No Model.) 10 Sheets—Sheet 8.
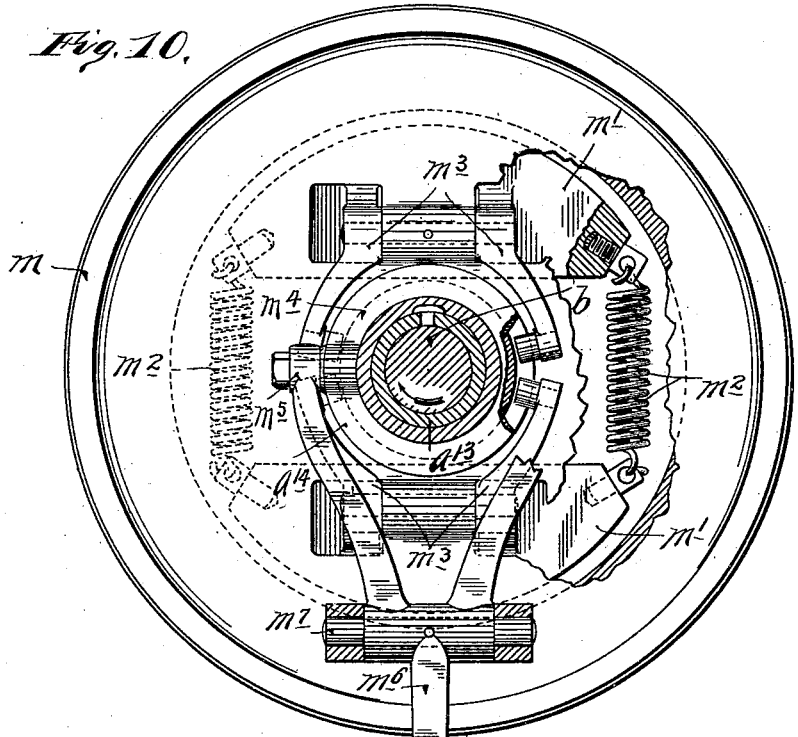
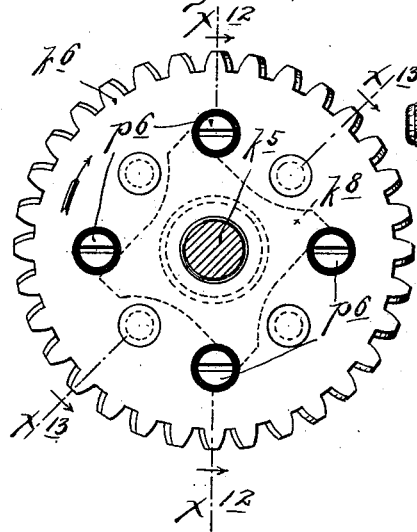
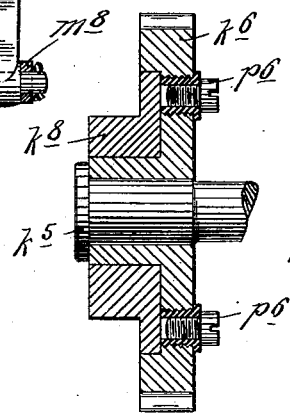
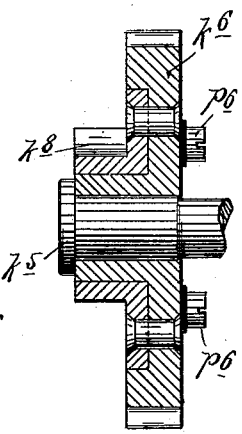
Witnesses.
Harry Kilym.
Elizabeth Keiher
Inventor.
Whitcomb L. Judson,
By his Attorneys.
Williamson & Merchant No. 712,805. Patented Nov. 4, 1902.
W. L. JUDSON.
EXPLOSIVE ENGINE.
(Application filed Apr. 25, 1901. Renewed July 3, 1902.)

(No Model.) 10 Sheets—Sheet 9.

Witnesses.
Harry Kilgore

Inventor:
Whitcomb L. Judson,
By his Attorneys,
Williamson & Merchant

No. 712,805. Patented Nov. 4, 1902.
W. L. JUDSON.
EXPLOSIVE ENGINE.
(Application filed Apr. 25, 1901. Renewed July 3, 1902.)
(No Model.) 10 Sheets—Sheet 10.
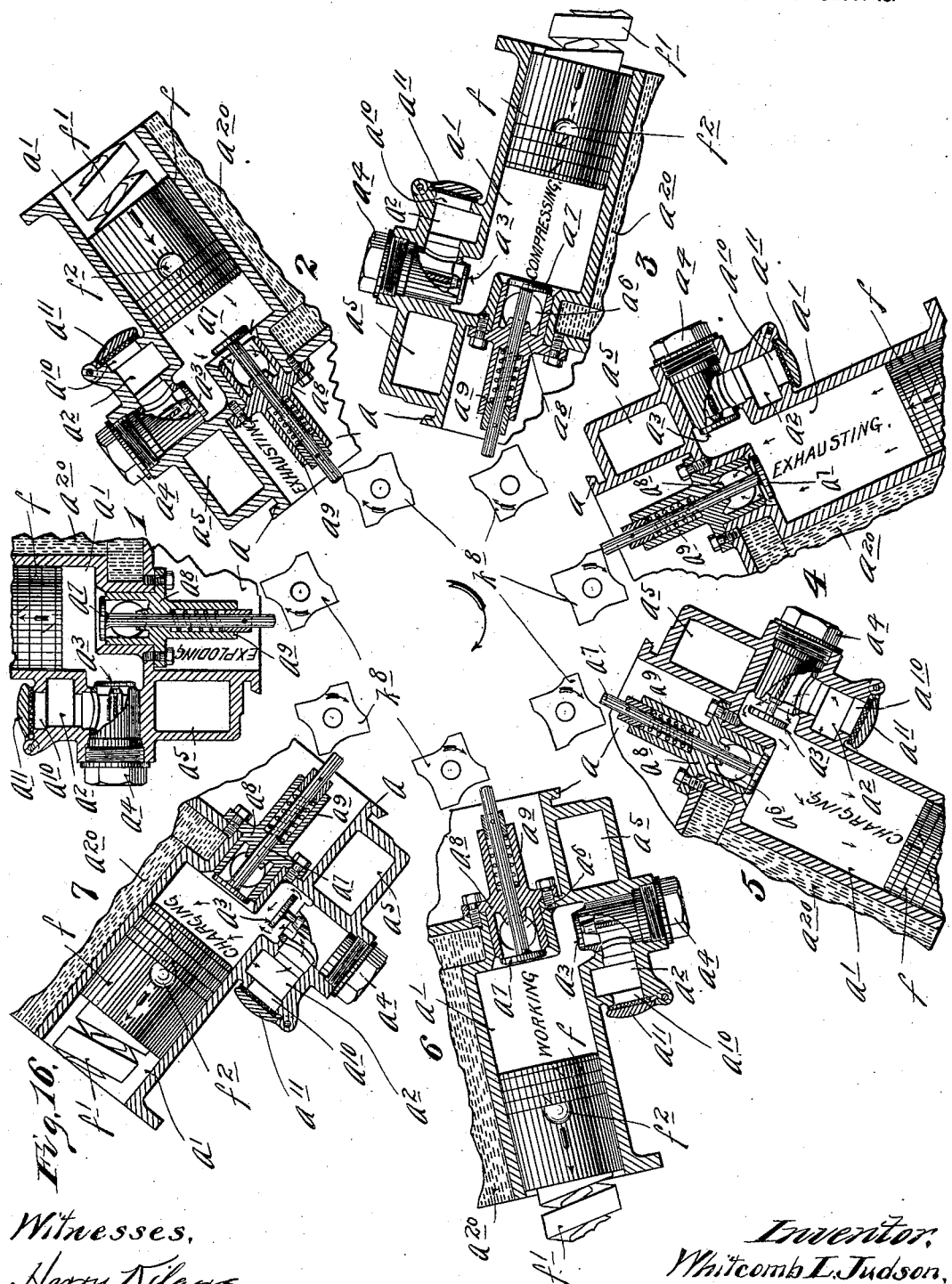

UNITED STATES PATENT OFFICE.

WHITCOMB L. JUDSON, OF CHICAGO, ILLINOIS.

EXPLOSIVE-ENGINE.

SPECIFICATION forming part of Letters Patent No. 712,805, dated November 4, 1902.

Application filed April 25, 1901. Renewed July 3, 1902. Serial No. 114,272. (No model.)

*To all whom it may concern:*

Be it known that I, WHITCOMB L. JUDSON, a citizen of the United States, residing at Chicago, in the county of Cook and State of Illinois, have invented certain new and useful Improvements in Explosive-Engines; and I do hereby declare the following to be a full, clear, and exact description of the invention, such as will enable others skilled in the art to which it appertains to make and use the same.

My present invention relates to explosive-engines, and is especially directed to the improvement of that type of multicylinder explosive-engine set forth and claimed in my prior application for Letters Patent of the United States, filed January 11, 1901, Serial No. 42,894, entitled "Explosive-Engines."

The invention consists of the novel devices and combinations of devices, hereinafter described, and defined in the claims.

The invention is illustrated in the accompanying drawings, wherein like characters indicate like parts throughout the several views.

Figure 2:
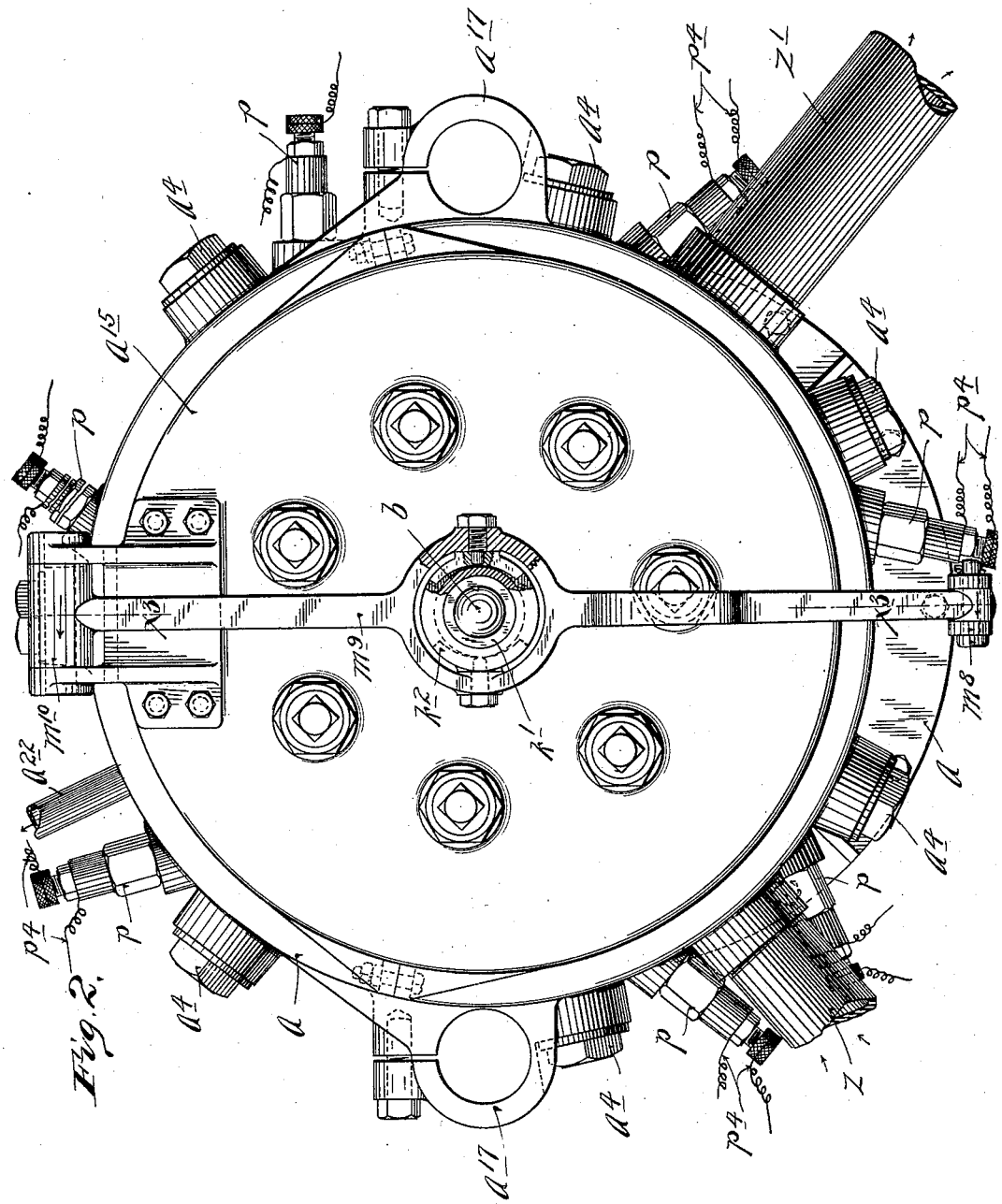
Figure 3:
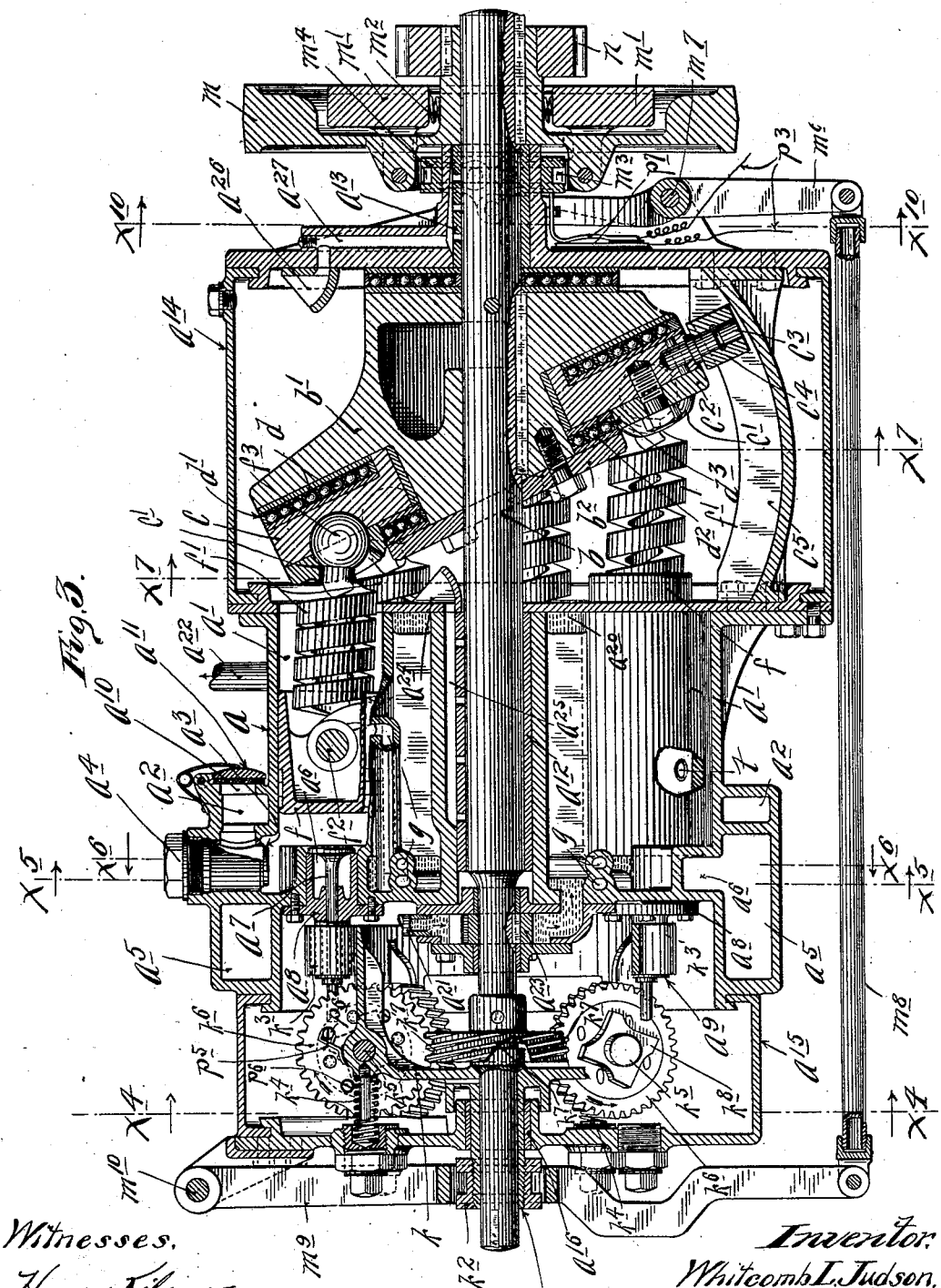
Figure 4:
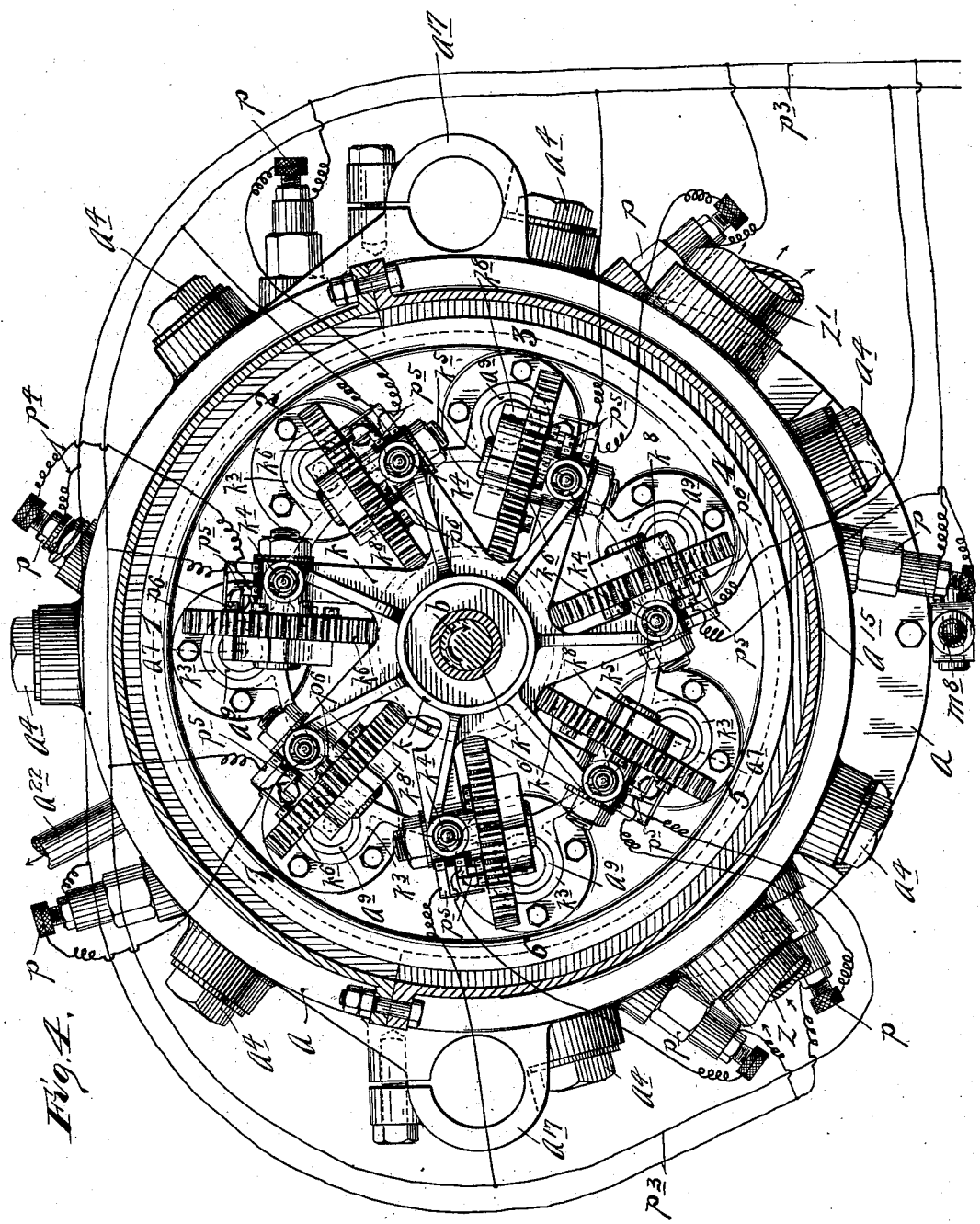
Figure 5:
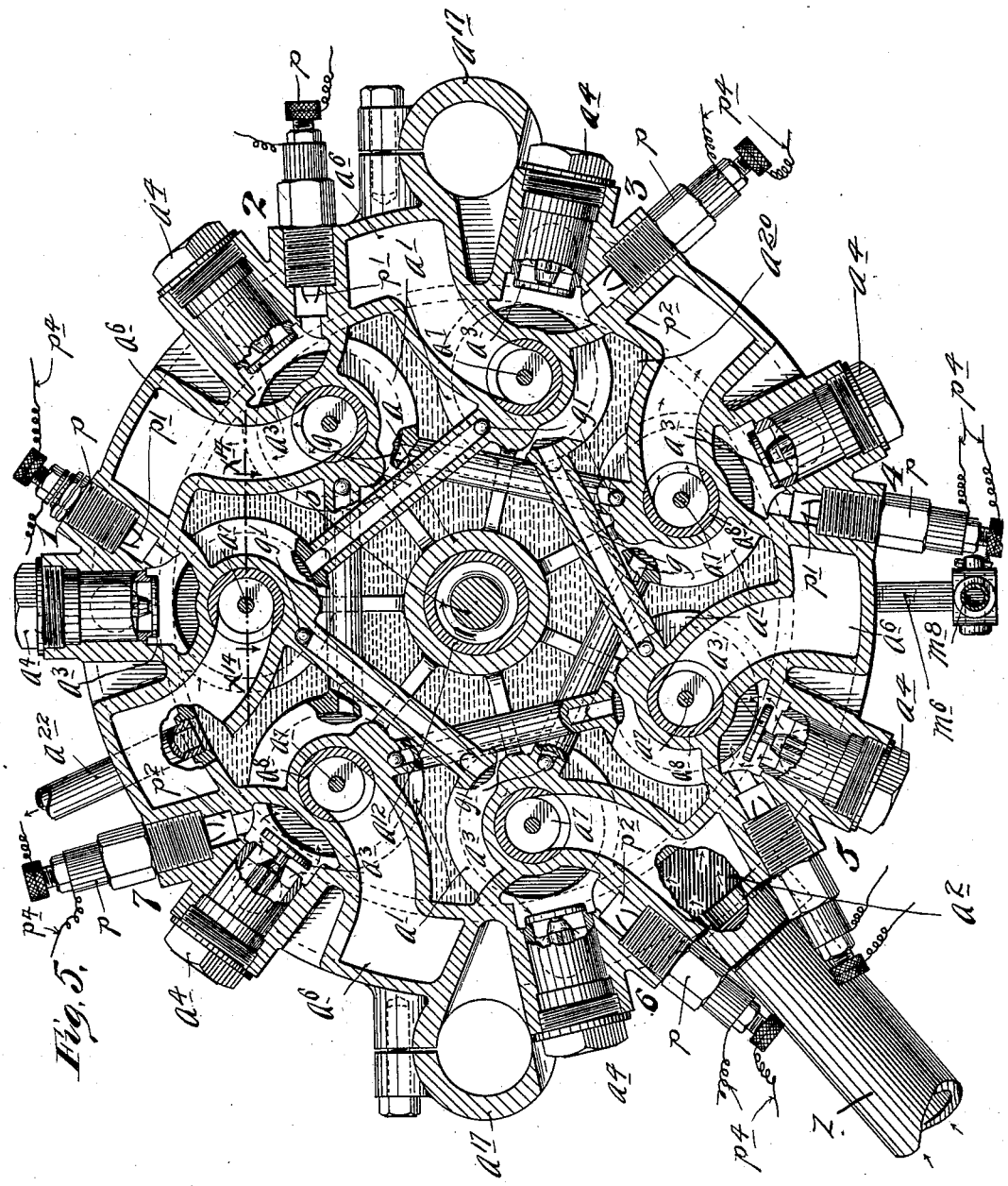
Figure 6:
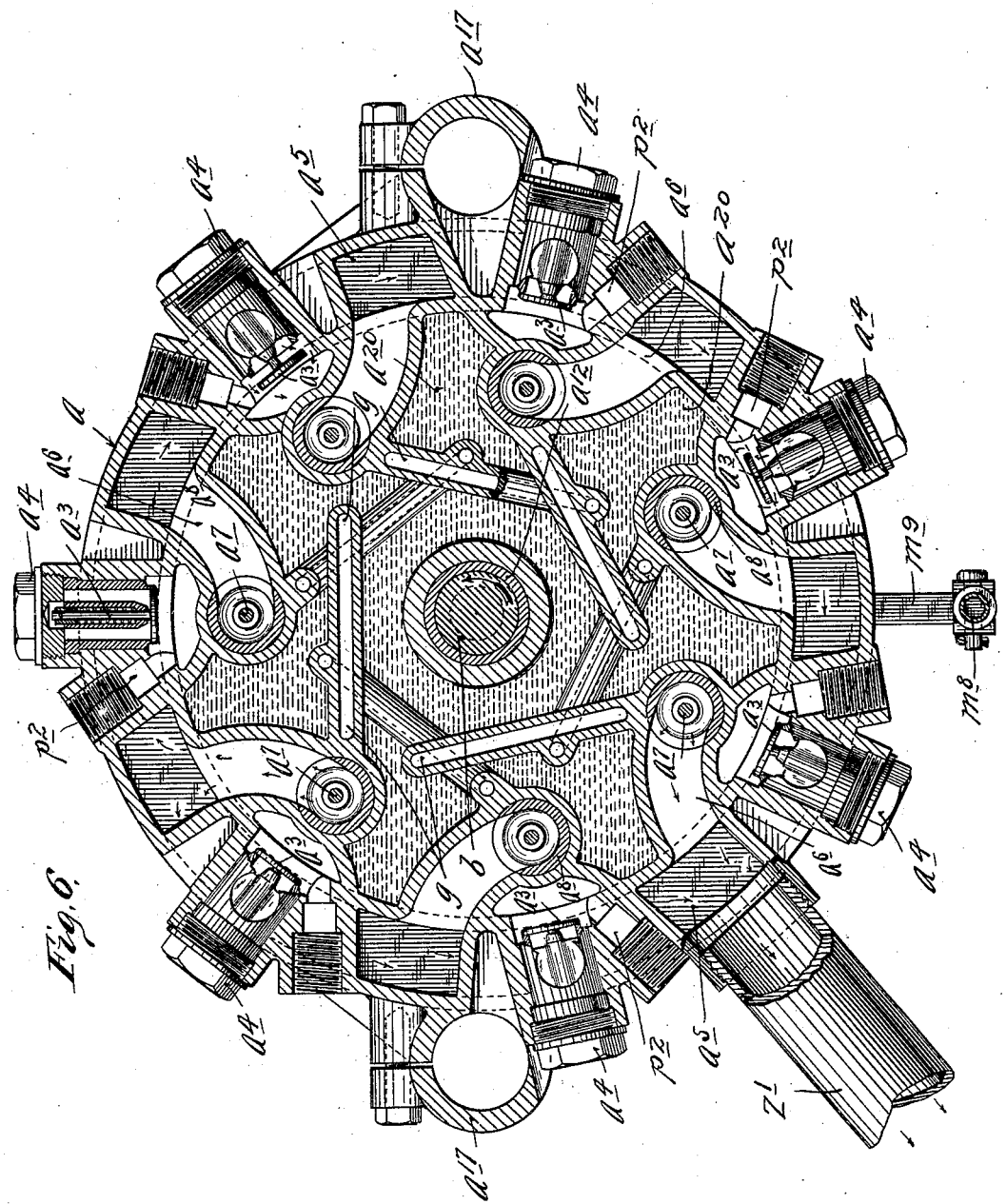
Figure 14:
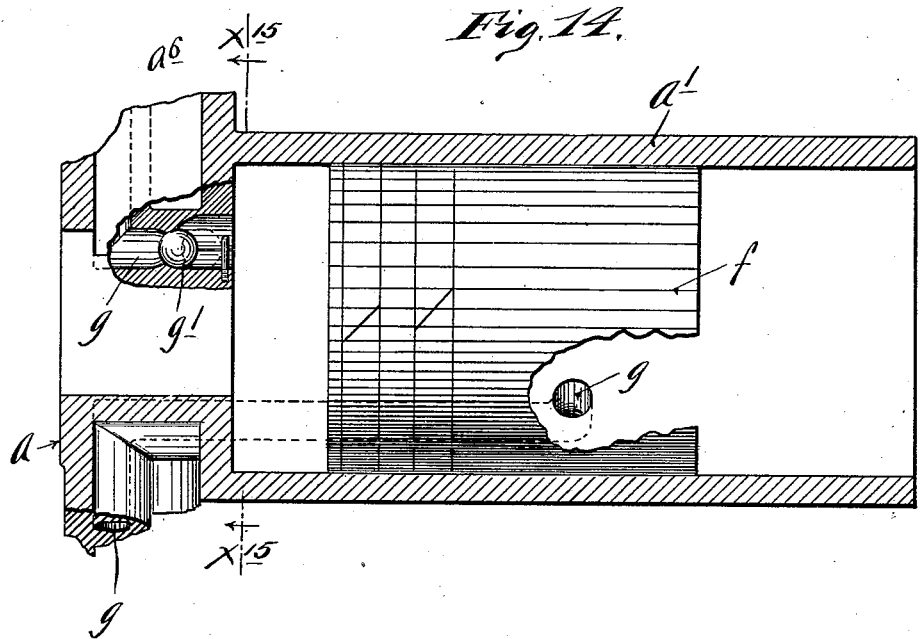
Figure 15:
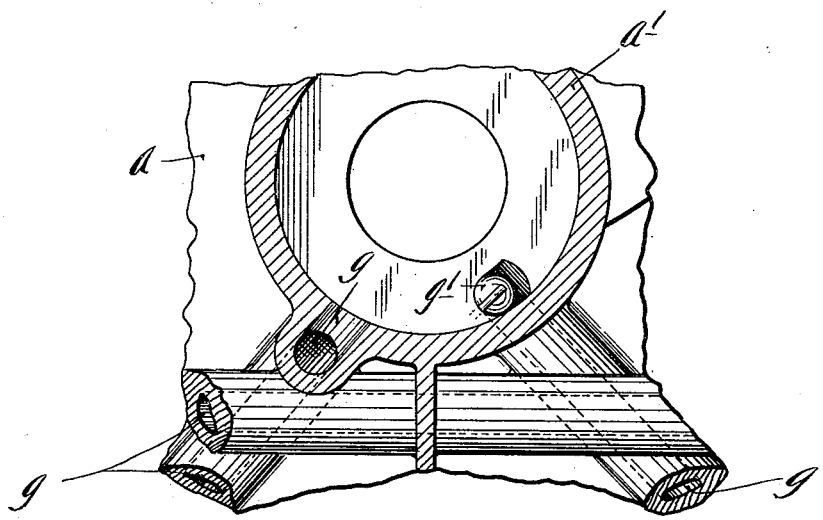

Figure 1 is a view in side elevation, showing an engine constructed in accordance with my invention. Fig. 2 is a front elevation of the engine, some parts being broken away, said view being on a larger scale than Fig. 1. Fig. 3 is a vertical section taken approximately on the line $x^3 x^3$ of Fig. 2, but in the same scale as Fig. 1. Fig. 4 is a vertical section on the line $x^4 x^4$ of Fig. 3. Fig. 5 is a transverse vertical section taken approximately on the line $x^5 x^5$ of Fig. 3, some parts being broken away and others being shown in full. Fig. 6 is a transverse vertical section taken approximately on the line $x^6 x^6$ of Fig. 3. Fig. 7 is a transverse vertical section approximately on the irregular line $x^7 x^7$ of Fig. 3. Fig. 8 is a detail in plan, showing one of the ball-retainers and a single ball held thereby. Fig. 9 is a section on the line $x^9 x^9$ of Fig. 8. Fig. 10 is a section on the line $x^{10} x^{10}$ of Fig. 3, some parts being broken away. Fig. 11 is a detail showing one of the worm-gears of the valve mechanism. Fig. 12 is a section on the line $x^{12} x^{12}$ of Fig. 11. Fig. 13 is a section on the line $x^{13} x^{13}$ of Fig. 11. Fig. 14 is a detail showing one of the cylinders and coöperating piston, taken approximately on the line $x^{14} x^{14}$ of Fig. 5, some parts being broken away and others being shown in full. Fig. 15 is a section on the line $x^{15} x^{15}$ of Fig. 14, some parts being broken away. Fig. 16 is a diagrammatic section showing the several cylinders projecting on radial lines, indicating their relative positions, but with the said cylinders cut by radial planes and turned flat on the sheet.

The cylinder-casting $a$ is of the proper form to afford a series of cylinders $a'$, opened at their rear or right-hand ends, as viewed in Fig. 3, and closed at their front or left-hand ends and arranged in a circle concentric to a common axis, like the chambers of a revolver. As shown, seven cylinders are provided, but this number may of course be varied. The casting $a$ is also formed with an annular gas-supply chamber or valve-chest $a^2$, having ports leading to the inner ends of the respective cylinders $a'$, but normally closed by spring-pressed intake-valves $a^3$, mounted in removable radially-seated plugs $a^4$. The said casting $a$ is also of proper form to afford a common annular exhaust-chamber $a^5$, which communicates through exhaust-passages $a^6$ with the inner ends of the respective cylinders. The exhaust-passages $a^6$ are normally closed by spring-pressed exhaust-valves $a^7$, that are also mounted in removable plugs $a^8$, which, for a purpose which will hereinafter appear, are provided with projecting hubs $a^9$, through which project the stems of the exhaust-valves $a^7$. A supply-pipe $z$ leads to the annular gas-chamber or valve-chest $a^2$, and an exhaust-pipe $z'$ leads from the annular exhaust-chamber $a^5$. When gasolene is used as a motive fluid, the supply-pipe $z$ would lead from a suitable carbureter or atomizer. (Not shown.)

The annular valve-chest $a^2$ is provided with one or more (as shown seven) ports $a^{10}$, that are normally closed by yieldingly-held safety-valves $a^{11}$. These valves $a^{11}$ readily open to relieve from back explosions, which may take place within the said annular valve-chest $a^2$.

At the axial center of the casting $a$ is a shaft-bearing $a^{12}$, in which the driving-shaft $b$ is mounted to run. At its rear end the shaft $b$ projects and works in the hub-like bearings $a^{13}$ of a heavy drum-like housing $a^{14}$ of suitable construction, rigidly securable to the cylinder-casting $a$. In a similar manner a heavy housing $a^{15}$ is secured to the forward portion of the cylinder-casting, and the forward end of the shaft $b$ is journaled in a suitable hub portion $a^{16}$ thereof.

In the construction illustrated the stationary framework, made up of the cylinder-casting $a$ and housing $a^{14}$ and $a^{15}$, is to be supported by heavy rods, (not shown,) which will be clamped by keeper-bearings $a^{17}$, $a^{18}$, and $a^{19}$ on the parts $a$ and $a^{14}$.

The cylinder-casting $a$ is cored out or cast hollow, so as to form a water-chamber $a^{20}$, which nearly embraces the cylinders $a'$ and is provided with water inlet and outlet pipes $a^{21}$ and $a^{22}$, respectively. As shown in Fig. 3, a suitable centrifugal pump $a^{23}$, which is driven by the shaft $b$, works at the junction of the inlet-pipe $a^{21}$ with the water-chamber $a^{20}$.

$a^{24}$ indicates an oil cup or pocket located on the forward wall of the housing $a^{14}$ and provided with an oil-distributing duct $a^{25}$ for delivering the oil to the bearing $a^{12}$.

$a^{26}$ indicates a similar oil cup or pocket located on the rear wall of the housing $a^{14}$ and provided with an oil-duct $a^{27}$, which leads to the bearing $a^{13}$. Working within the housing $a^{14}$ and rigidly secured on the shaft $b$ is a crank afforded by a head or block $b'$, the face of which is annular and extends in a plane which obliquely intersects the axis of the said shaft $b$. On the oblique face of the crank $b'$ is a loosely-seated thrust-ring $c$, set in the same plane relative to the axis of the shaft $b$ as is the oblique face of the said crank $b'$. Between the face of the oblique crank $b'$ and the thrust-ring $c$ is a plurality of balls $d$, held by a perforate spacing-ring $d'$. Between the outer face of the thrust-ring $c$ and a retaining-plate $b^2$ on the hub of the crank-head $b'$ is another series of bearing-balls $d^2$, held by the spacing-ring $d^3$ of the same construction, except as to size, as the said spacing-ring $d'$.

The thrust-ring is provided with a plurality of ball-sockets $c'$, (as shown seven, to correspond to the number of cylinders,) the outer sections of which are shown as afforded by a common keeper-ring $c^2$, bolted or otherwise detachably secured to the said thrust-ring $c$.

At one point the thrust-ring $c$ is also provided with a radially-projecting stud or pin $c^3$, on which is loosely journaled a roller $c^4$, which serves as a cross-head.

The roller or cross-head $c^4$ works in a segmental channel-shaped guide $c^5$, which is rigidly secured at its end to the end walls of the housing $a^{14}$. The guide $c^5$, acting on the roller or cross-head $c^4$, holds the thrust-ring $c$ against rotation with respect to the cylinder-casting, but permits the same a free wabbling motion under the action of the crank-head $b'$.

Working within each cylinder $a'$ is a piston $f$, as shown, of cup-like form. The several pistons $f$ are connected to their respective sockets $c'$ of the thrust-ring $c$ by means of resilient piston-rods or pitmen afforded by heavy spiral springs $f'$, pivotally connected to the interiors of said pistons at $f^2$ and connected to said sockets at their other ends by balls or heads $f^3$.

In my prior invention I employed resilient piston-rods or pitmen which would yield slightly under the force of the explosions. However, in the said prior device the said pitmen or rods were so stiff that they would not yield under the force applied to them in compressing the charge.

As a feature of my present invention, as indicated in the general statement, these resilient piston-rods or pitmen are made of such tension or strength that they will yield materially under the compressing-stroke, thereby giving an increased explosion chamber or space at the inner end of the cylinder, and under the exhaust-stroke will extend to their normal lengths, and thereby force the piston close to the inner end of the cylinder and completely clear the cylinder of the products of the explosion. This feature is important and I believe new.

In the diagram view, Fig. 16, and in the sectional views 4 and 5 the direction in which the crank-shaft $b$ is assumed to be rotated is indicated by arrows marked at the central portions of such figures, and the observer is supposed to be looking at the said parts from the front end of the machine or from that end which projects to the left in Fig. 3. The several individual straight-line engines afforded by the cylinders $a'$ and coöperating parts are marked consecutively in the direction of the rotation of the shaft $b$ by the numerals 1 to 7, inclusive. This is done to make clear certain illustrations hereinafter given.

In considering the most important feature of my present invention—to wit, the arrangement of the flame ducts or passages between the cylinders—attention is particularly directed to Figs. 5, 14, and 15. These flame tubes or ducts may take any suitable form, either, as shown, by coring them into the main casting $a$ or otherwise forming them; but in practice they would probably be most conveniently afforded by small gas-pipe or similar tubing. In the drawings said flame-ducts are indicated by the letter $g$, and it will be noted that in this fore-cycle construction they connect alternate cylinders. More specifically stated, said ducts $g$ connect said cylinders $a'$ in the following order—to wit, 1 3 5 7 2 4 6 1. In this manner, it will be observed, the cylinders are connected in an endless series, so that the explosion in the order indicated will be repeated over and over again.

From what has just been stated it of course follows that an explosion in a particular cylinder will take place only once in two complete rotations of the shaft $b$ and that of two adjacent cylinders one will receive the explosion under one rotation of said shaft, while the other will receive the explosion under the next rotation thereof.

By reference particularly to Fig. 14 it will be noted that the outlet ends of the ports $g$ open from the cylinders $a'$ at their intermediate portions, while the other ports open into said cylinder at their extreme inner ends. In each port or flame-duct $g$ is a check-valve $g'$, (shown as afforded by a ball,) which check-valve permits the free flow of the flame into the inner end of the cylinder, but closes under the force of the explosion and prevents a back or reverse flow. The mouth of the outleading port or duct $g$ is ordinarily closed by the coöperating piston $f$, but is opened when the said piston moves outward nearly or quite to its extreme position. The location of this mouth of the outgoing port must, however, depend on the number and relation of the cylinders—that is, the arrangement must be such that each cylinder will have its charge exploded when the crank stands in the proper position relative thereto.

Working within the housing $a^{15}$ is a spider-like bracket $k$, which has a central sleeve $k'$, mounted to slide loosely on the shaft $b$ and provided at its projecting end, outward of the housing $a^{15}$, with a head $k^2$. Each prong of the bracket $k$ is provided with a sleeve $k^3$, which slides loosely on one of the hubs $a^9$ of the removable bushings $a^8$, noted in the early part of the description. The said bracket $k$ is thus held against rotation, but with freedom for a limited sliding movement in the direction of the axis of the crank-shaft $b$. Springs $k^4$ yieldingly hold the bracket $k$ in its extreme position toward the right with respect to Fig. 3.

Loosely mounted on bearing-studs $k^5$, one on each arm of the bracket $k$, is a plurality of radially-disposed worm-gears $k^6$, in number seven, to correspond to the number of cylinders, as best shown in Figs. 3 and 4. In proper location to mesh with all of the worm-gears $k^6$ the crank-shaft $b$ is provided with a worm or screw $k^7$. Each worm-gear $k^6$ carries a so-called "trip-cam" $k^8$, each of which, as shown, has four projecting arms or points located in position for successive action on the projecting stem of the corresponding exhaust-valve $a^7$, as best illustrated in Figs. 3 and 16.

With the four-cycle arrangement it is evident that a particular exhaust-valve should be opened once for every two rotations of the shaft $b$ and that it will be opened with the arrangement described four times for each complete rotation of the corresponding worm-wheel $k^6$ and trip-cam $k^8$. In other words, the trip-cam $k^8$ should be given each a one-eighth rotation for each rotation of the crank-shaft $b$. By providing worm-gears with thirty-two teeth and by providing the worm or screw $k^7$ with four parallel threads this timing is accomplished.

In the diagram view, Fig. 16, the relative positions of the trip-cams $k^7$ to the stems of the coöperating exhaust-valves $a^7$ and the relative positions of the several pistons and of the intake and exhaust valves at the instant the explosion is taking place in the cylinder 1 are fully illustrated. By reference to said diagram view, Fig. 16, it will be noted that the piston of the engine No. 1 stands some little distance—an inch, for instance—from the inner ends of the cylinder. This, as will be remembered, is due to the fact that the spring piston-rod has yielded to that extent under the compressing force required to compress the charge. The cylinder of engine No. 2 is exhausting, but the piston thereof has not yet reached its extreme innermost position. When the said piston reaches its extreme innermost position, it will stand approximately at the extreme inner end of the said cylinder, due to the fact that the spring piston-rod has assumed its maximum length, as also previously pointed out.

At the right-hand or rear end of the machine the crank-shaft $b$ is provided with a fly-wheel $m$ and, as shown, also with a gear $n$, from the latter of which power may be transmitted. Pivoted to the fly-wheel $m$ is a pair of weighted governor-levers $m'$, of bell-crank form, the weighted ends of which are yieldingly drawn inward by springs $m^2$ connecting them, as shown in Fig. 10. The inturned arms $m^3$ of said levers $m'$ (see Figs. 3 and 10) are provided with pins which work in the annular groove of a loose sliding collar $m^4$, mounted on the hub of the housing $a^{14}$.

The sliding collar $m^4$ is connected at $m^5$ to the arms of a shipper-lever $m^6$, pivoted at $m^7$ to the housing $a^{14}$. The lower arm of the said lever $m^6$ is connected by a rod $m^8$ to the lower end of another shipper-lever $m^9$, pivoted to a bracket $m^{10}$ on the forward plate of the housing $a^{15}$. The intermediate portion of this lever $m^9$ is bifurcated and is pivotally connected to the collar $k^2$, previously noted as secured on the sleeve $k'$ of the sliding bracket $k$. With this construction when a predetermined maxium speed of the engine has been reached or closely approached the weighted ends of the levers $m'$ will be thrown outward, and through the connections described the bracket $k$ will be moved bodily forward or toward the left with respect to Fig. 3. Under normal conditions when an arm or prong of a trip-cam $k^8$ engages the corresponding valve-stem it will hold that exhaust-valve open during approximately a one-half rotation of the crank-shaft; but as the bracket $k$ is moved forward, carrying with it the worm-gears $k^6$ and cams $k^8$, the time during which the said exhaust-valves will be held open will be gradually decreased until the said trip-cams are thrown entirely out of action. The speed of the engine will of course be varied by thus varying the opening of the exhaust and the explosions will cease whenever the said exhaust-valves are no longer open. It is of course evident that as soon as the speed of the engine is sufficiently decreased the parts of the valve-gear will be restored to operative positions and will assume their normal functions.

The electric igniting device for use in starting the engine and running the same until it has acquired a predetermined initial speed may take various forms, but is conveniently arranged as illustrated in the drawings and best shown in Figs. 3, 4, and 5 and detail views 11 and 12.

I prefer to employ ordinary jump-spark plugs or devices $p$, having electrodes $p'$, which, as shown, are exposed in pockets $p^2$, that open directly into the inner ends of the respective cylinders. Main-circuit wires $p^3$, which extend to and from the suitable source of current-supply, are provided with branch or shunt circuits $p^4$, that extend to and from the several sparking-plugs $p$, as shown in Fig. 4. Each shunt-circuit $p^4$ includes a pair of brushes or contact-pieces $p^5$, between which the circuit is normally broken. Each wormwheel $k^6$ is provided with four insulated contact studs or screws $p^6$, which are arranged to move with a properly-timed action between the laterally-projecting ends of the said contact-pieces $p^5$, and thereby close the circuit and cause a spark and explosion within the corresponding cylinder.

The main circuit $p^3$ (see Fig. 3) includes a pair of contact-pieces $p^7$, shown as secured to and insulated from the outer plate of the housing $a^{14}$. The outer contact-piece $p^7$ is under spring tension to separate from its mate and is provided with an outturned portion, which when the engine is standing still or running slowly is engaged by the sliding collar $m^4$, and thereby held in engagement with its said mate. When, however, a certain initial speed has been acquired, the weighted governor-levers $m'$ will be thrown slightly outward, the collar $m^4$ will be moved slightly toward the left, and the main circuit will be broken between the contacts $p^7$, so that the entire sparking device will be rendered inoperative.

The function of maintaining the proper explosions will of course, as already stated, be then taken up by the igniting flame-tube.

The letter $t$ indicates relief-cocks which are normally closed, but which when opened reduce the amount of compression which will be given to the charges in the various cylinders. These relief-cocks will be opened up to start the engine and will be closed after the engine is under good speed.

It will of course be understood from what has already been said that the several features of my invention, and especially the arrangement of igniting flame-tubes between the cylinders, may be modified in many ways within the scope of my invention.

What I claim, and desire to secure by Letters Patent of the United States, is as follows:

1. A multicylinder explosive-engine having its cylinders connected in an endless series by flame-ducts, the last of which connects the last cylinder with the explosion-chamber of the first cylinder, whereby the charges in the several cylinders are exploded in a continuous recurring order.

2. A multicylinder explosive-engine having its cylinders connected in an endless series by flame-ducts, check-valves in said flame-ducts, the last of the said ducts serving to connect the last cylinder with the explosion-chamber of the first cylinder, substantially as and for the purposes set forth.

3. A multicylinder explosive-engine having flame-ducts which connect, in an endless order of succession, the intermediate and end portions of the several cylinders, the last duct connecting the last cylinder in the explosion-chamber of the first cylinder, and pistons of the said engine working as valves to open and close the said ducts, substantially as described.

4. A multicylinder explosive-engine of the four-cycle type, having an odd number of cylinders, and flame-ducts extending between alternate cylinders and connecting the said cylinders in an endless series, substantially as described.

5. A multicylinder explosive-engine of the four-cycle type, having an odd number of cylinders, flame-ducts extending between alternate cylinders and connecting the several cylinders in an endless series, check-valves in said flame-ducts, and with the pistons within the several cylinders operating as valves, to open and close said flame-ducts in the proper order, substantially as described.

6. In a multicylinder explosive-engine, the combination with a plurality of cylinders in parallel arrangement and pistons working therein, of a crank-shaft parallel with the said cylinders, and provided with an obliquely-set crank, a thrust-ring on said oblique crank and spring piston-rods or pitmen connecting said pistons to said thrust-ring, which spring-rods are of such tension that they will yield under the force required to compress the charge, substantially as described.

7. In a multicylinder explosive-engine, the combination with a crank-shaft having an obliquely-set crank, of a non-rotary thrust-ring seated on said crank, a plurality of cylinders disposed in parallel arrangement around said shaft, pistons working in said cylinders, pitman-rods or links connecting said pistons and thrust-ring, and relief-cocks opening from said cylinders, intermediate of the extreme position of the inner ends of said pistons, for reducing the compression in starting the engine, substantially as described.

In testimony whereof I affix my signature in presence of two witnesses.

WHITCOMB L. JUDSON.

Witnesses:
 JOHN M. YOUNG,
 JAS. M. SKEAFF.